May 25, 1937. J. A. ANGLADA ET AL 2,081,260
INTERNAL COMBUSTION ENGINE
Filed May 3, 1934 7 Sheets-Sheet 7

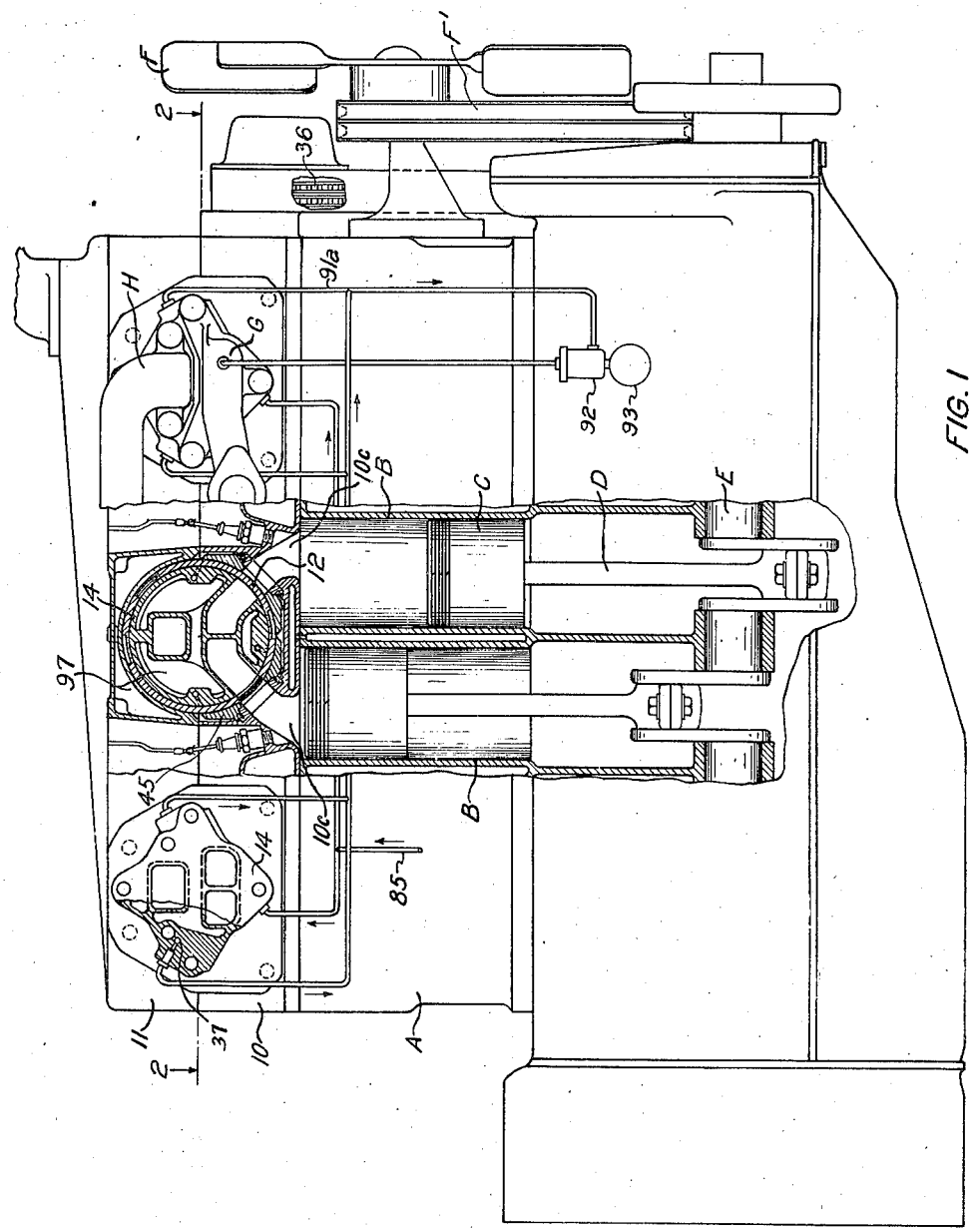

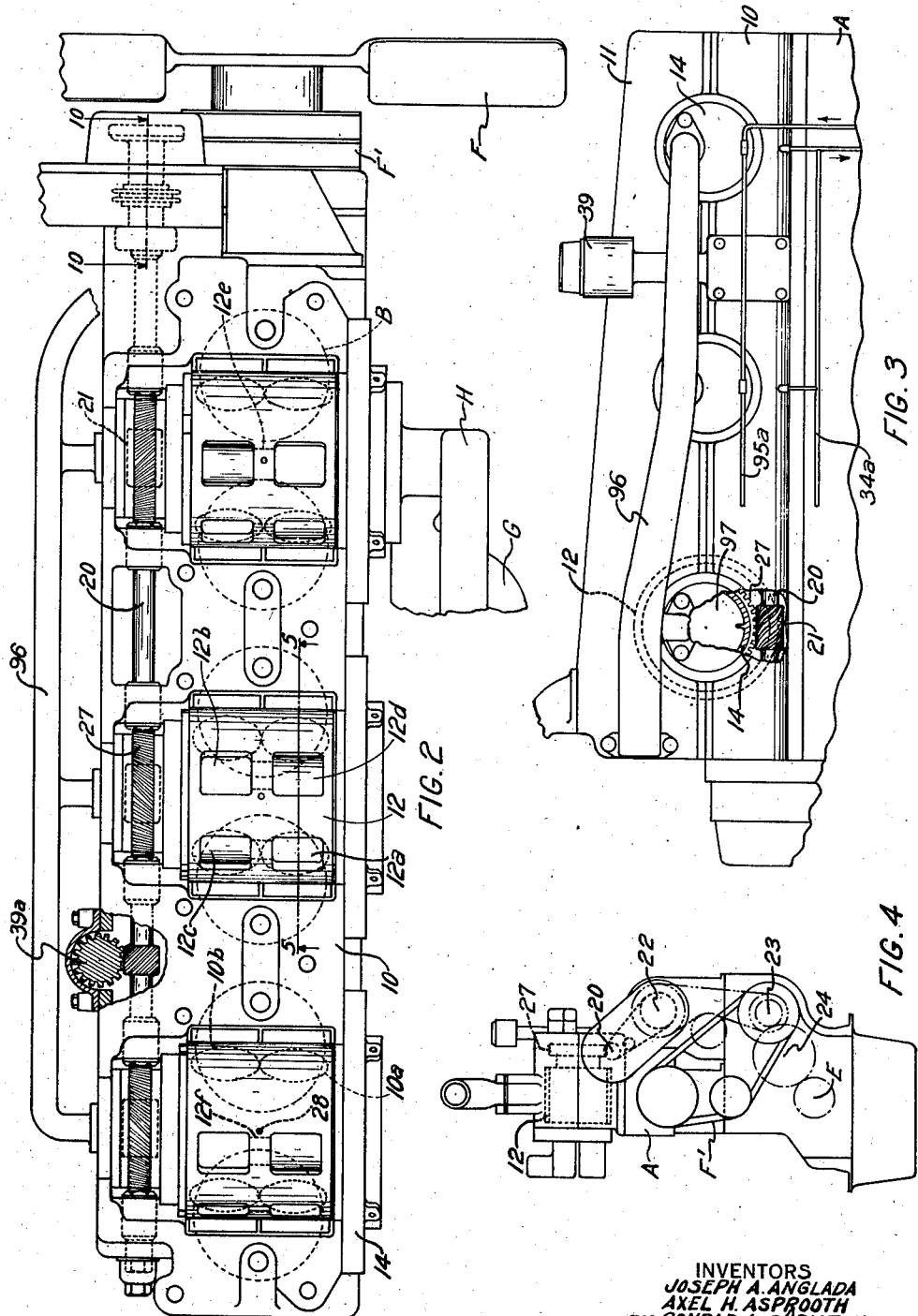

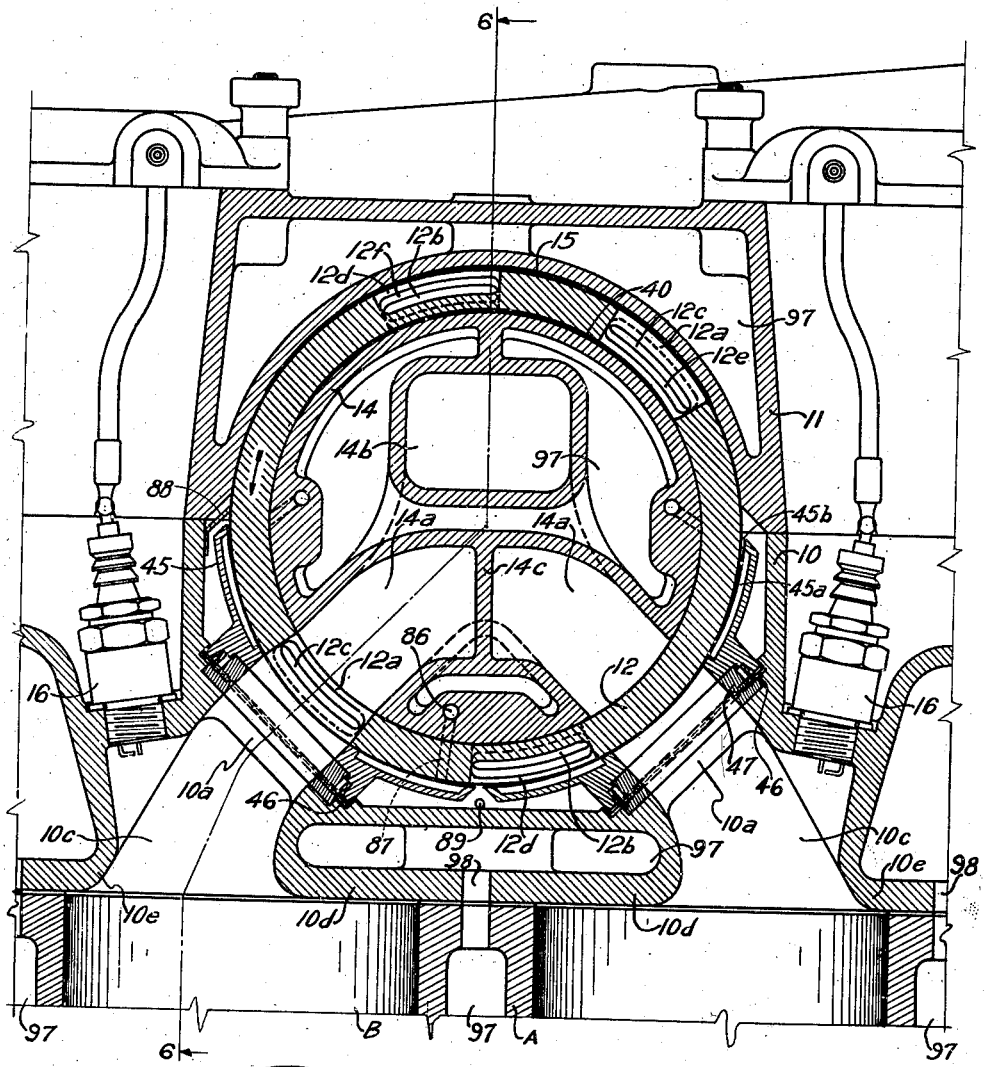

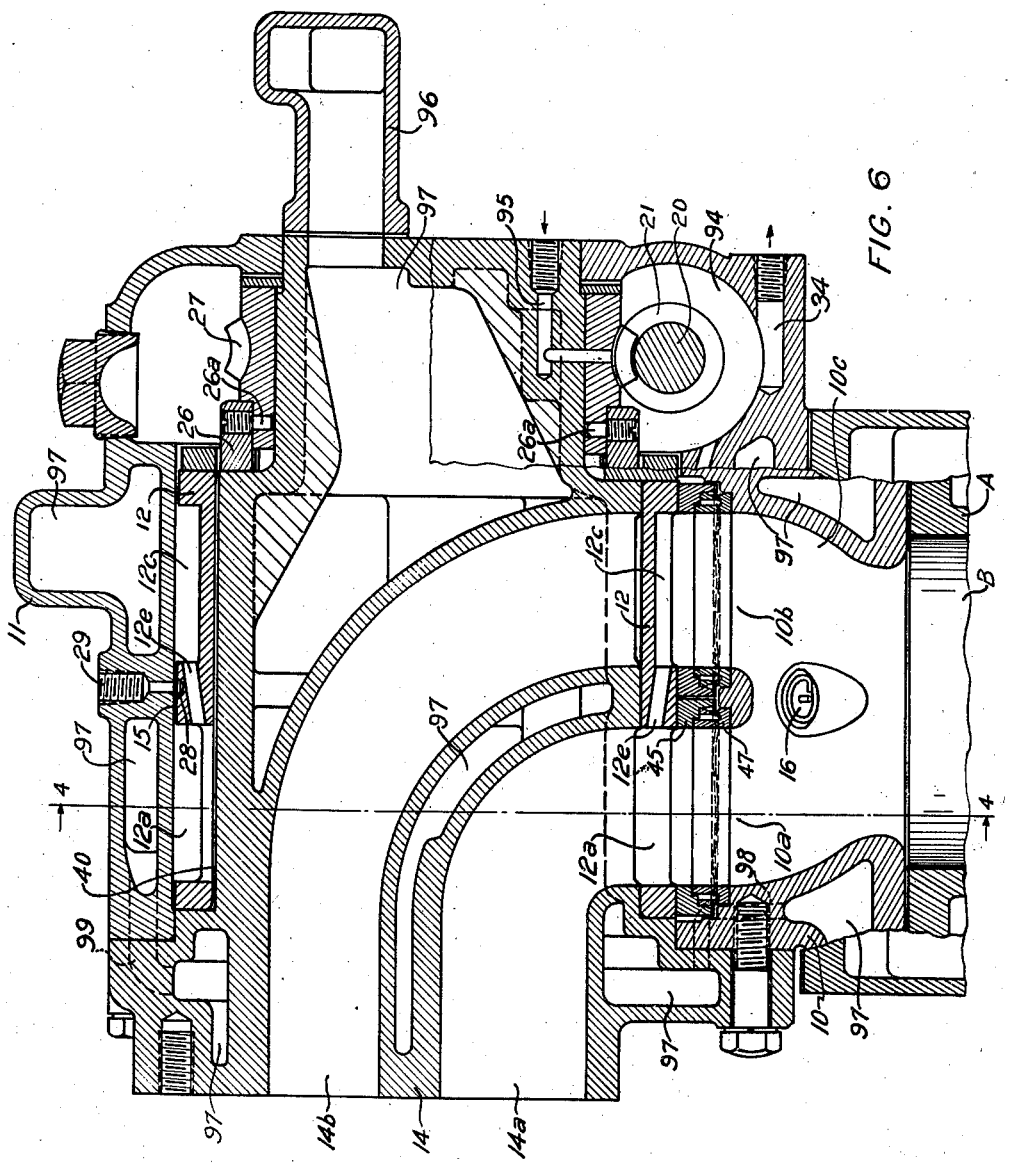

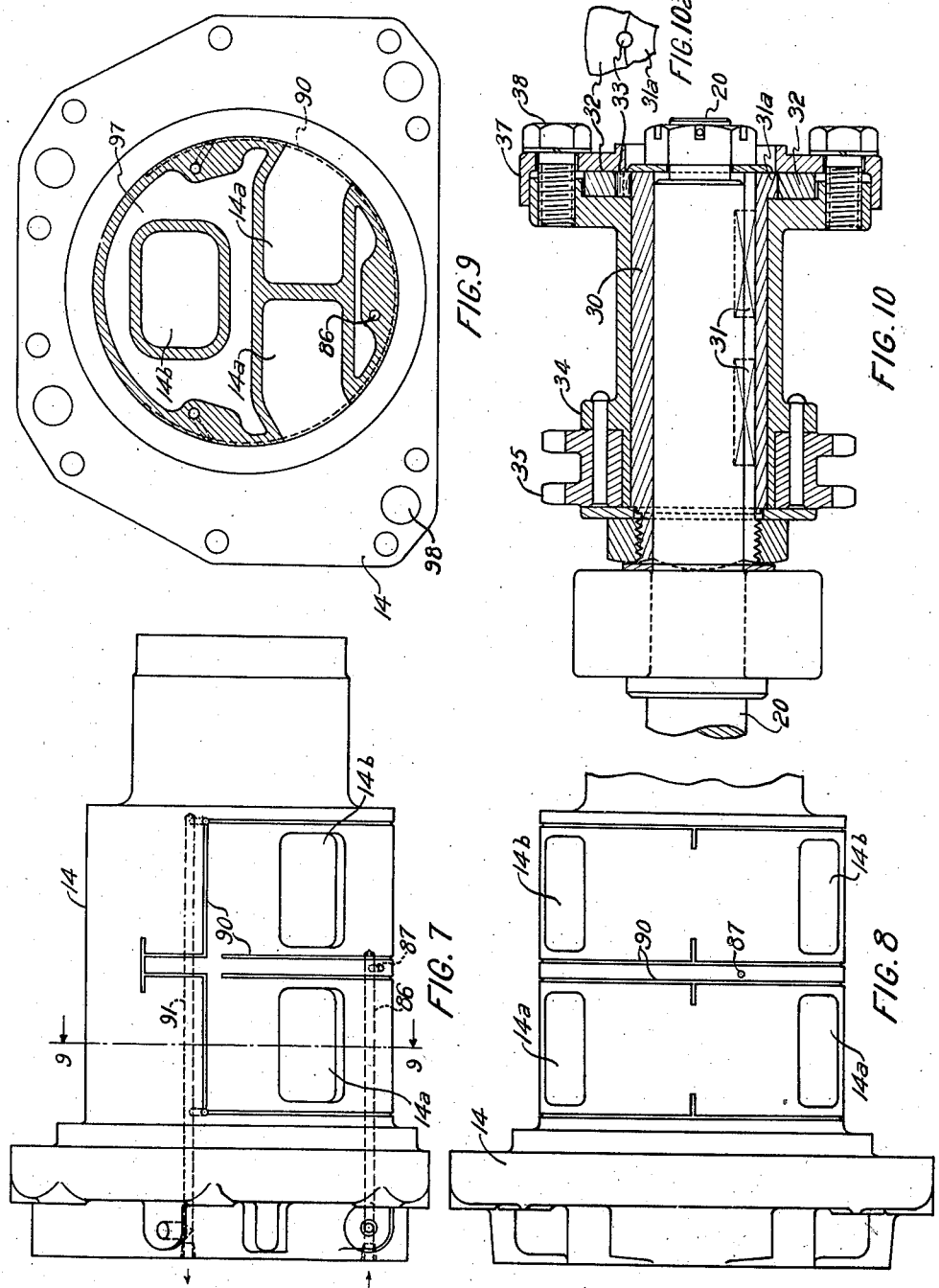

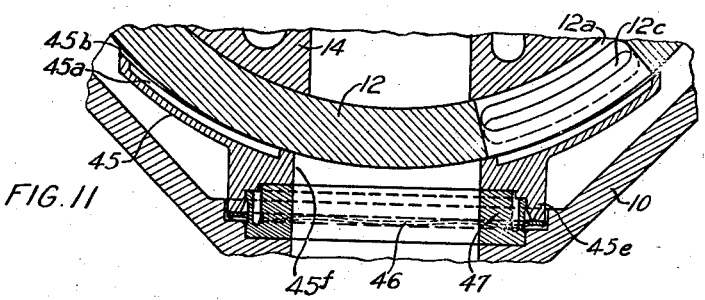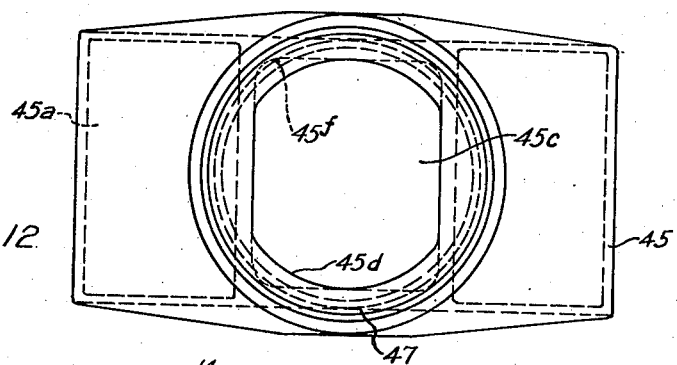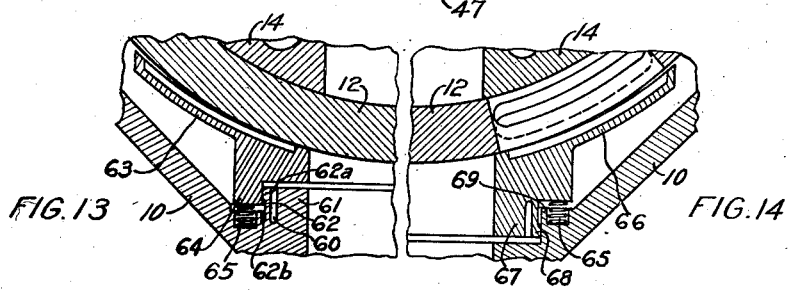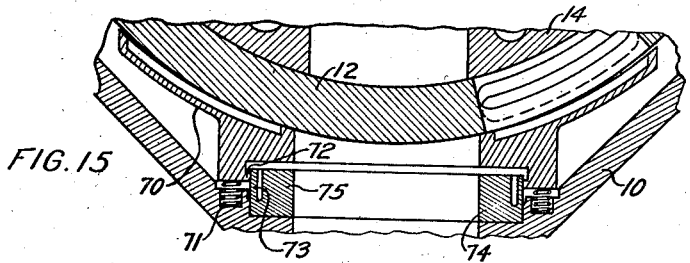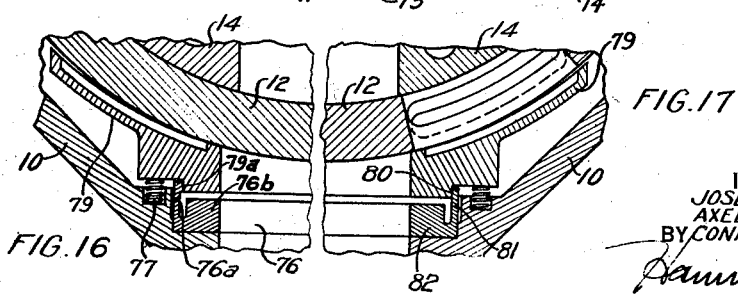

INVENTORS
JOSEPH A. ANGLADA
AXEL H. ASPROOTH
BY CONRAD L. CHRISTENSEN
ATTORNEYS

Patented May 25, 1937

2,081,260

UNITED STATES PATENT OFFICE 2,081,260

INTERNAL COMBUSTION ENGINE

Joseph A. Anglada, Axel H. Asprooth, and Conrad L. Christensen, New York, N. Y., assignors to Anglada Motor Corporation, New York, N. Y., a corporation of Delaware Application May 3, 1934, Serial No. 723,686

30 Claims. (Cl. 123—190)

This invention relates to improvements in valve mechanisms of the rotary sleeve type for internal combustion engines, compressors and the like and more particularly relates to a tubular or cuff type valve with intake and exhaust ports in different planes adapted for rotation about an axis at an angle to the cylinder bores.

One of the principal objects of this invention is to provide a valve mechanism in which a single tubular valve rotating in phase with the engine crankshaft, and having its axis transverse or parallel to the crankshaft, controls the admission and exhaust cycles of one or more cylinders.

Another object of the invention is to provide a valve mechanism comprising a minimum number of parts which are simple in design, easily manufactured, and which can be speedily and accurately assembled and to provide means for automatically compensating for wear so that no adjustment, replacement or refitting of the parts is required during the life of the engine.

Another object of the invention is to provide a valve mechanism in which the temperature and mechanical stresses are low, thus permitting continuous high speed maximum power operation of the engine and to provide means for cooling the valve mechanism which insures a uniform temperature throughout in which parts subjected to the greatest heat are exposed to the greatest cooling effect thus facilitating adequate lubrication and minimum wear.

Another object of the invention is to provide a valve mechanism in which the gas passages from the gas manifolds to the cylinders are short and direct and may be of any desired size and shape, so that a high volumetric efficiency is maintained throughout the speed range of the engine.

Another object of the invention is to provide a sealing means on the inner surface of the valve to withstand the difference in gas pressures between the intake and exhaust manifolds and to provide an improved sealing means on the outside of the valve to seal against the higher cylinder gas pressures under all conditions of temperature, speed and power.

Another object of the invention is to provide a lubricating system which will control the circulation of the lubricant so that the bearing surfaces of the parts will be flooded with lubricant and the excess will be drained and prevented from entering the cylinders to be wasted and cause smoke.

Further objects and advantages of the invention will appear from the following disclosure thereof taken in connection with the attached drawings which illustrate preferred forms of embodiment of the device, and in which:

Figure 1 is a side elevation partly in section of a six cylinder internal combustion engine to which the valve mechanism of our invention has been applied for illustration.

Figure 2 is a top view partly in section showing the valve mechanism assembled but with the valve casing cover removed and taken substantially on the line 2—2 of Figure 1.

Figure 3 is a partial side elevation of the engi 1e shown in Figure 1 taken from the opposite side, parts being in section, Figure 4 is a front elevation of the engine shown in Figure 1, at a reduced scale and diagrammatic in part.

Figure 5 is a vertical section taken substantially along the line 5—5 of Figure 2 on an enlarged scale, showing the valve casing cover in place.

Figures 5a and 5b are plan and side views of one form of sealing shoe spring.

Figure 6 is a vertical section transverse to the section shown by Figure 5 and taken substantially along the line 6—6 of Figure 5, the combustion chamber being a developed view.

Figure 7 is a side elevation of the valve core.

Figure 8 is a bottom plan of the valve core.

Figure 9 is a vertical section of the valve core taken substantially on the line 9—9 of Figure 7.

Figure 10 is a vertical section of the safety release mechanism and taken substantially along the line 10—10 of Figure 2.

Figure 10a is a front elevation of a detail of the release mechanism shown in Figure 10.

Figures 11, 11a, and 12 are respectively a partial horizontal section, an enlarged detail, and an elevation of one form of the port sealing structure including the sealing shoe, sealing ring, and the valve, valve core and valve casing, Figures 13 to 17 inclusive are detail sectional views of modified forms of sealing shoe and sealing ring construction and associated parts.

Figure 18:
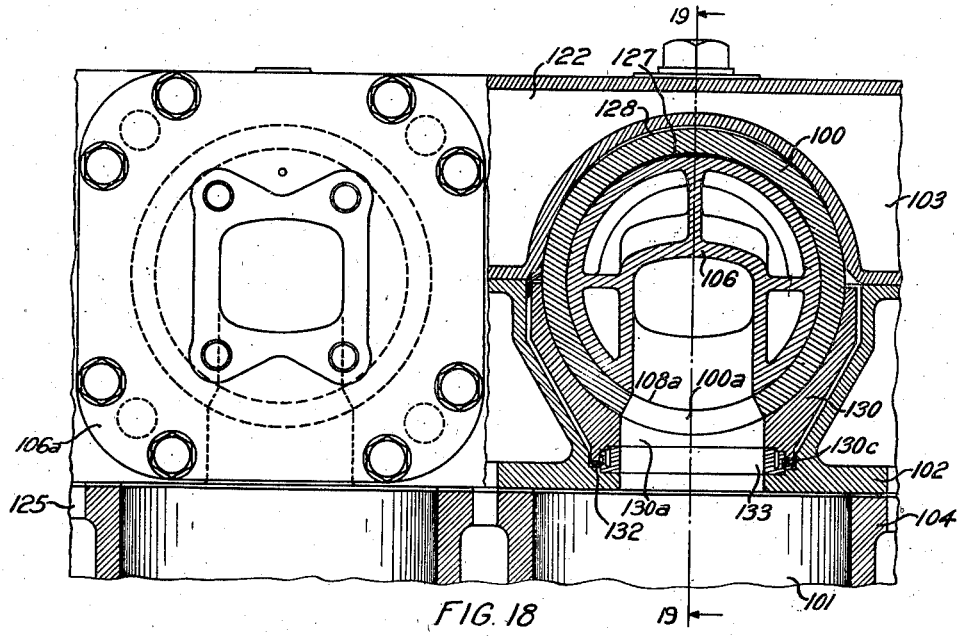
Figure 19:
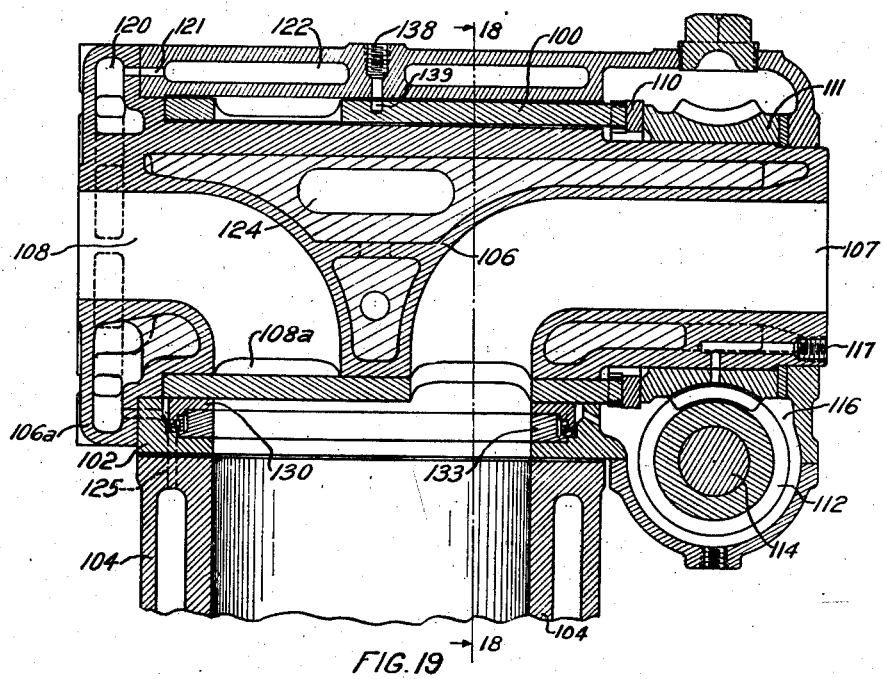

Figure 18 is a partial side elevation, with parts in section of a modified form of valve and manifold construction and, Figure 19 is a vertical section taken substantially along the line 19—19 of Figure 18.

The heretofore used poppet valve and operating mechanism for internal combustion engines has not proven adequate to withstand the increased thermal and mechanical stresses resulting from the development of higher compression and power in modern internal combustion engines. Higher speeds and greater power demand such increase in valve size for satisfactory volumetric efficiency as to exceed the limitations of space available for poppet valves. These higher speeds also introduce insurmountable problems in valve inertia, spring surge and valve seat impact of poppet valve mechanisms.

In the present invention we have provided a valve mechanism which overcomes the limitations of the poppet valve and has practical features of superiority over all other forms of valve mechanism of which we have knowledge.

One form of embodiment of our invention as applied to an internal combustion engine is generally illustrated in Figure 1. Such an engine normally includes the cylinder block A having a plurality of cylinders with walls B, in which pistons C reciprocate with connecting rods D connected to the crankshaft E in the conventional manner. Our improved valve mechanism is carried in a valve casing 10 over the cylinder block. This casing may be integral with or detachable from the cylinder block. To facilitate manufacturing and assembling operations the valve casing is provided with a valve casing cover 11, which is shown enclosing the entire top of the motor, but individual casings and covers may be provided for each valve if desired. Such an engine is also usually provided with the fan F driven by fan belt F' to facilitate cooling of the cooling medium which may be circulated by a pump, not shown, through the usual cooling passages. External intake and exhaust manifolds G and H are also typical equipment to conduct the gases into and out of the cylinders.

The valve casing 10 and valve casing cover 11, are adapted to receive short tubular valves 12 at an angle to the bore of the cylinders B and preferably at an angle to the longitudinal axis of the engine. These valves control the intake and exhaust of the respective cylinders as shown in enlarged view in Figures 5 and 6. In this preferred form of embodiment, the single tubular valve 12 and its core 14, serves a pair of cylinders by means of the intake and exhaust passages 14a and 14b which are shown to emerge on the same side of the engine. The rotary valve 12 has two intake ports 12a and two separate exhaust ports 12b in different planes which correspond to the intake and exhaust passages 14a and 14b in the core 14 and also the ports 10a and 10b in the valve casing 10 leading to and from the compression chambers 10c formed in the valve casing 10 over each cylinder B. The rotation of the valve 12 will thus open and close the compression chambers to the intake and exhaust of gases as is well understood in the art.

The valves 12 have a clearance 15 at the top of their housing below the valve casing cover 11, the cover 11 being of greater diameter than the diameter of the valve through a substantial portion of its area so that the valves are free to expand and rotate through their upper orbit without touching this cover. The valves do not contact with the lower valve casing 10 but are contacted by sealing shoes hereinafter described. The valve casing 10 rests on the cylinder block A, however, and preferably forms offset combustion chambers 10c with each cylinder, the flange 10d being wider than the diametrically opposite flange 10e thus promoting turbulence in the combustible mixture and facilitating combustion with resultant economy. The spark plugs 16 are shown in a position at about the center of the combustion chamber. Experience has proven that satisfactory performance with gasoline as a fuel can be obtained with the spark plug located as shown, but if desired, additional spark plugs may be used or other forms of ignition may be provided.

The valves 12 each have a pair of blind ports or depressions 12c and 12d which are in line with the true valve ports 12a and 12b and spaced longitudinally of the valve therefrom. The blind intake port 12c for example is in the same plane as the true intake port 12a, but is located longitudinally of the valve sleeve so as to register with the exhaust outlet from the combustion chamber when the true intake port 12a registers with the inlet to the combustion chamber. These two ports are connected by a suitable conduit 12e as shown in Figures 5 and 6, so that combustible gases flowing through the intake passage 14a may enter the combustion chamber both through port 12a and also to a lesser extent through conduit 12e and the depression or blind port 12c. In a similar manner, the exhaust port 12b in the valve 12 is in communication with the blind exhaust port 12d by means of passage 12f so that exhaust gases may flow out through the true port 12b and also through this blind port 12d and passage 12f.

The use of these blind ports has many advantages, but it particularly provides a more rapid opening and closing of the combustion chamber. On intake, this increases the effective port area, and materially increases the volumetric efficiency. On exhaust, its use is even more important for it is not only necessary to quickly remove the burned gases, but it is desirable to remove the heat as soon as possible. With the increased port area, this is readily accomplished without sacrifice of size. Improved pressure balance on the valves is also obtained.

With a multi-cylinder engine such as of the six cylinder in line type as shown in Figure 1, a plurality of valves is desirable for maximum efficiency in manifolding and each valve has a rotary speed which is directly proportional to the crank shaft speed although one long valve may be used. The valves may be driven in any suitable manner from the crank shaft and in our preferred construction all valves are driven by a common valve drive shaft 20, which is connected to the crank shaft E by gears 22, 23, and 24, and a suitable chain drive, particularly shown in Figure 4. The gears 22 and 23 represent the usual accessory drives including generator, oil pump and air compressor, and the valves may be linked in with them. It is of course obvious that any other positive drive for the valve could be substituted for the arrangement shown.

The drive for the respective valves and the timing control is by means of an adjustable coupling 26 shown in Figure 6, which coupling is in driving relation with the valve 12 and in adjustable relation with the gear 27 which is driven from the shaft 20 through the worm 21. Preferably, the parts 26 and 27 have a number of holes differentially spaced so that relative angular adjustment can be obtained between the gear and the valve after which the timing screws 26a are inserted to lock the parts together. This is desirable inasmuch as in the sub-assembly of each valve unit, the valves are located in place in the casing and the gears 27 meshed with the drive gear 21 and it is then necessary to initially time the valves with relation to each other. This is accomplished by rotating each valve so that a timing mark 28 in the top center of each valve will appear in holes 29 in the valve casing cover 11 as shown in Figures 2 and 6. It is therefore unnecessary to accurately locate circumferentially the teeth in the manufacture of the gear coupling and after the initial assembly of the coupling 26 and valve gear 27, the valve timing is permanently accurate. The ports in the valves are timed with relation to the pistons of the engine by an adjustable coupling shown by Figure 10. This coupling is fitted to the valve drive shaft 20, but it could be installed on any other revolving part of the valve drive mechanism between the crankshaft and final drive. The coupling consists of an inner hub part 30, keyed to shaft 20, by suitable keys 31 and it has an enlarged flange portion 31a. This flange fits loosely inside of collar 32 and as shown in Figure 10a, the parts rotate together through shear pin 33. The shear pin 33 will break at a predetermined overload should shaft 20 become excessively loaded due to failure of lubrication supply to the valves or any other cause, thus preventing damage to the valve drive or the valves or their cores. The shaft is supported in bearings 20a of any desired type.

Outside of the inner hub 30 is outer hub 34 with its driving gear 35 which carries chain 36 as shown in Figure 1 to rotate the shaft 20. Flange 37 serves to clamp collar 32 in frictional driving contact to hub 34. When clamping means 38 are loose, the shaft 20 may be rotated with the valves relative to driving gear 35 so that any timing relation between the crank shaft of the engine and valve drive shaft 20 may be obtained. When the valves are all in proper position as indicated by mark 28, the clamping device 38 is tightened to fix the adjustment and the engine is ready to run.

The shaft 20 may also conveniently drive the distributor 39 by a suitable gear drive and the distributor drive shaft 39a as is well known in the art.

The valves 12 rotate about a central core 14 which acts as a journal as well as a manifold extension and which is provided with an internal water cooling chamber 97 to cool the valve. As more particularly shown in Figures 7, 8, and 9 the core is preferably a single casting which is bolted to the face of the engine and which extends entirely through the valve and out of the opposite side of the engine to act also as a journal for the drive gear 27 and to act as an intake for the cooling fluid.

More particularly referring to Figure 5, it is to be noted that the gas passages 14a and 14b in the core 14 are uniform in cross section with the valve casing ports 10a and 10b thus providing a direct unrestricted path for the flow of the gas and promoting high volumetric efficiency for the engine at high speed.

It is to be noted that the gas passages can be arranged so that a manifold can be used on opposite sides of the engine without changing the valve or its operating mechanism, and it is also possible, as will be hereinafter described, to control a single cylinder with a single valve. For passenger car engine operation however, it is preferable to have a single valve for controlling the intake and exhaust to a plurality of cylinders thereby reducing the number of operating parts to a minimum. It is of course also possible to control more than two cylinders with a similar valve arrangement if desired. The exhaust passage 14b is adapted to serve two cylinders, while intake passage 14a is divided at 14c to separately distribute the fuel mixture to each cylinder. This promotes uniformity in distribution.

The core 14 is preferably of a smaller diameter or machined to a smaller diameter through a substantial part of the periphery, preferably near the top as at 40 so that the valve 12 is free to expand and contract in its upper orbit. The valve must necessarily be a true cylinder for proper rotation and provision is therefore made for the desirable expansion and contraction due to changes in temperature. The clearance space between the valve 12 and valve core 14 is possible inasmuch as the core is provided with all the cylinder ports at the bottom and it is possible to maintain sealing contact between the valve 12 and the core throughout the lower half of its diameter for most effective operation.

In order to seal the valves at the intake and exhaust ports, we provide sealing shoes 45 of which there are preferably four per valve, one adjacent each port in each cylinder. The sealing shoes 45 are preferably carried by the valve casing 10 and bear against the valve 12. The shoes are located directly adjacent the respective ports and surrounding the same and are preferably slightly more than three times as wide as the valve port to prevent suction of oil into the ports and escape of exhaust gases into the valve casing when the ports are partially closed. The shoes are forced against the valve in its rotation by undulated spring members 46 shown in Figures 5a and 5b.

Although we prefer separate sealing shoes for both exhaust and intake ports it is to be understood that a single shoe having one or more ports therein may be found desirable under certain conditions for controlling both the intake and exhaust as hereinafter described.

In operation the valve 12 expands more than the sealing shoe 45, and to allow for this the sealing face of the shoe has a clearance of about .005" at the tips or wings, as shown at 45b in Figure 11, due to the radius of curvature of the shoe being slightly larger than the outside radius of the valve. To reduce the friction and facilitate lubrication between the shoe and the valve and insure a perfect seal at all times, the curved face of the shoe is provided with depressions or relieved areas adjacent the port. In operation the cylinder gas pressures, acting on the lower side of the shoe nearest the combustion chamber, tend to force the shoe against the valve. To partially balance this effect, the port opening, as shown at 45d in Figure 12, is enlarged on its curved sealing end as shown by 45f. This enlargment provides a surface against which the cylinder gas pressures exert a counterbalancing force tending to partially overcome the force of the spring 46 and the force of the gas pressure on the under side of the shoe.

The sealing shoe 45 is maintained under pressure tight conditions with the valve housing 10 throughout its movement by the use of a sealing ring 47 which is generally shown in Figure 5, and which is shown in enlarged section in Figure 11. The ring 47 is a separate piece and is made with a flexible wall 47a shown in Figure 11a. It also preferably has a narrow sealing flange 47e which contacts with a portion of the sealing shoe 45. The diameter of the flange 47e is slightly greater than its accommodating recess in the hub 45e of the shoe 45 and when the ring and shoe are fitted the pressure between the flange of the ring and the hub in the shoe is not great enough to restrict the relative movement of the two, but is sufficient to prevent leakage of gas around the flange. The flexibility of this flange 47e is such that when the gas pressure is applied to the cavity 47c due to the opening between the shoe and ring as the shoe moves against the valve, the ring will adjust itself to the shoe and will effectively seal it.

The sealing ring 47 has a press fit in an annular groove in the valve casing, the fit of the sealing ring with the valve casing being tighter than with the shoe. This prevents any movement of the ring with respect to the valve casing. The main portion of the ring 47 consists of a thick wall section 47b which may extend higher than the thin flange section 47a and being between the flange section and the hot gases it will prevent the flame from reaching or damaging the thin and more resilient flange section. As shown in Figure 11, the spring 46 is used to normally press the sealing shoe 45 against the valve 12 and thus to hold the valve 12 against the internal core 14 and maintain gas tight conditions on the inside as well as the outside of the valve.

The fit of the sealing ring in the shoe is important because if the fit is too tight an excessive spring pressure on the part of the spring 46 would be necessary. On the other hand if the fit is too free, leakage will occur. Furthermore, if the shoe and the sealing ring are both made stiff and rigid instead of flexible, changes of temperature will affect the operation of the engine. It is therefore necessary to have a seal which will operate perfectly at both high and low temperatures and which will flexibly conform to slight variations in the size and shape of the valve as well as the shoe when subjected to gas pressures in the engine.

Figure 12 is a bottom view of the sealing shoe 45 with the sealing ring 47 in position. The port 45c is indicated to be of substantially rectangular shape with curved ends 45d to cooperate most effectively with circular ring 47. On the sealing face of the shoe next to the valve 12 the port opening as shown in dotted lines 45f is more nearly rectangular to provide a more rapid port opening and closing than obtainable with the circular port, and to counter-balance the force of the cylinder gas pressures tending to force the shoe against the valve.

Modified forms of sealing means are shown in Figures 13–17 inclusive. In Figure 13 the valve casing 10 is machined to provide the equivalent elements of the sealing ring including the annular groove 60 between the main upstanding portion 61 acting as the flame protector and heat deflector and the relatively resilient thin wall portion 62 which cooperates at 62a with the relatively movable sealing shoe 63. The sealing shoe 63 has a projecting portion 64 which in this form cooperates with the relatively narrow face 62a for sealing and with the spring 65 on the bottom to hold the shoe in normal contact with the valve. It is preferable to undercut the casing at 62b to increase the resilience of the thin wall section 62.

A still further modified form of construction is shown in Figure 14 which is substantially the reverse type of construction shown in Figure 13. In this case the sealing shoe 66 is provided with the sealing members including the relatively resilient narrow sealing portion 68 which cooperates with the projection 69 on the valve casing 10. A heat protector 67 is also provided to shield the thin wall 68. A similar helical coil spring 65 or other spring device may be used to normally force the sealing shoe 66 into sealing contact with the valve 12.

In both the forms of Figures 13 and 14, the sealing members are integrally formed as a part either of the valve casing or the shoe which may more generally be defined as the relatively fixed member and the relatively movable member. This arrangement may be found more satisfactory under certain conditions, but generally the replaceable ring is preferable.

The construction shown in Figure 15 is similar to that shown in Figure 11 in that a separate sealing ring 74 is provided between the sealing shoe 70, cooperating with the valve 12 and the relatively fixed member, valve casing 10. The sealing shoe 70 is held in position against the valve 12 by means of the spring 71 of which there may be a plurality and which may be of coil shape. The sealing shoe 70 has a projecting portion 72 cooperating with the thin resilient wall portion 73 of the ring 74. In this form of construction, the thin wall 73 and the flame protecting portion 75 are substantially straight surfaces and undercutting is eliminated on the ring although the shoe may be undercut to reduce the area of contact between the shoe and ring to provide a small resilient bearing area which facilitates the movement of the shoe on the ring.

It is to be understood that in all of these cases where there is a third element, the sealing ring fits with a tight high friction press fit in the cooperating fixed member, usually the valve casing, and that the contact between the thin resilient sealing wall of the ring and the contacting portion of the sealing shoe is of relatively small area whereby friction is materially reduced so that the parts may have relatively free movement.

A slightly further modified form of sealing construction is shown in Figure 16. The sealing ring 76 is provided with an upstanding thin resilient wall or sealing portion 76a extending beyond the protecting portion 76b and cooperating with the sealing shoe 79 which is held against the valve 12 by a suitable coil spring 77. The contacting portion of the thin wall 76a of the ring 76 is of increased cross section at the point of contact 79a. The resultant action is that the valve shoe 79 is normally held against the valve 12 and regardless of its position, the sealing ring 76 will keep the port sealed.

In Figure 17 the same conditions exist although the point of contact 80 is between the sealing shoe 79 and the reduced cross section of the upstanding portion 81 of the sealing shoe 82. The thin wall 81 is not undercut but has parallel inner and outer walls.

In the construction of Figures 16 and 17, the thin wall is initially stretched to cover the annular ring-like portion on the shoe, it being understood that steel sections, for example, can be more readily stretched than contracted. The relatively thin section forming the sealing means contacts with the opposite part and the sealing need not be protected from heat. This is satisfactory in air compressors as there is less danger of burning.

While we have described in detail the sealing rings, and while this is of importance in making a tight engine it will be understood that it is only a detail of construction and may be omitted or changed without changing the spirit of our invention.

Lubrication of the valve and valve mechanism is preferably by force feed means introducing the oil into the necessary places. We prefer to introduce oil into certain sections adjacent the valve and remove it at other points and this reduces smoking and oil consumption. One arrangement is generally shown in Figure 1, in which the oil passes through ducts 85 into each valve core 14 and by suitable openings 86, as shown in Figure 5, it passes to the valve 12. The close contact between the valve and core in this area prevents the free escape of the oil except when holes 87 in the valve register with ducts 86. During such registry oil is fed to the outside of the valve in measured quantities and any excess is scraped off by a scraper bar 88 which serves to distribute the oil over the face of the valve and cooperates to drain the balance down into the crank case by passages 89. Oil fed to the inside of the valve by ducts 86 is carried around to clearance space 40 between the core and the valve where it is free to spread and cover the entire outside surface of the valve.

Excessive accumulation of oil between the valve and core is prevented by draining some oil through the circumferential and axial grooves 90 on the outside of the core as shown in Figures 7 and 8. These grooves connect with the duct 91 as shown in Figure 1 which in turn is connected to an oil trap 92 and this in turn is operated from the vacuum in the intake manifold G and the oil is thus drained into the pump 93 and returned to the crank case of the engine.

Lubricant may be delivered to the timing gear housing 94 as shown in Figure 6 through the duct 95 and drained if necessary through the port 34. The lubricant for the remaining parts of the engine will be distributed in the usual manner.

The water cooling of the engine is of considerable importance and is facilitated by external manifold 96 which conducts the water from the valve casing cover 11 to the respective cores 14 such as shown in Figure 3. The water continues into the water passages 97 throughout the valve core 14 as shown in Figure 6 in which it is free to circulate entirely around the intake and exhaust passages 14a and 14b and to circulate around the combustion chamber 10c. The water is drawn off into the cylinder block A through passages 98 so that no pockets for the formation of steam result. The water cooling is designed to provide maximum cooling of the hot parts and less cooling of other parts so as to maintain a uniform temperature. Suitable conduits 99 are also provided in the valve core and valve casing cover 11, and the cylinder block and the lower valve block G as shown in Figure 5 for further flow of water into the cylinder block A.

The tubular valve of the rotary transverse type also is suitable for a single cylinder or one valve for each cylinder in a multi-cylinder engine where adequate spacing can be provided between the respective cylinders. This construction is more adaptable to high compression engines such as air compressors or Diesel engines where higher compressions are desired. In a preferred construction as shown in Figures 18 and 19 the valve 100 is carried between the valve casing 102 and the valve casing cover 103 which may preferably be detachably secured to the cylinder block.

Mounted within the valve structure is the valve core 106 which contains a plurality of inlet and exhaust passages 107 and 108. These are substantially co-axial with the valve although they extend in opposite directions permitting the intake and exhaust manifolds to be on opposite sides of the engine. The passages have suitable ports 108a which register with similar ports 100a in the valve 100. At suitable periods these ports open, permitting the intake and exhaust gases to flow into and out of the combustion chambers.

The valve 100 is rotated through a suitable coupling 110 which may be adjustable for timing through the worm gear 111 which is driven in turn by the worm 112 mounted on a suitable driving shaft 114. The gear 111 is mounted on the end of the valve core 106 which acts as a bearing. The gear 111 is lubricated by oil entering the lubricant chamber 116 through a suitable lubricant channel 117, or other suitable means. For convenience in timing the valves each may be provided with a center point 139, observable through opening 138 to indicate when the valve is in a predetermined position.

The valve core 106 has a large head plate 106a which is substantially hollow permitting the water to pass around the passage 120 through a suitable passage 121 into the valve casing cover 103 into the passages 122. The water also circulates freely in the water passages 124 and it also enters the valve casing 102 through similar ports and it passes by passages 125 into the cylinder block 104. It is therefore possible to cool all parts of the valve core, valve casing and the valve casing cover and such parts are in free communication for adequate cooling without formation of steam pockets etc.

There is a peripheral clearance 127 between the valve core and valve above a horizontal plane through the center of the valve for the distribution of lubricant. The valve casing cover 103 is also formed to allow a clearance 128 with the outer circumference of the valve so that expansion and contraction of the valve will not make frictional contact where not desired. This clearance will vary for different types of service but is substantial for free movement at all times. It is also to be noted that it is unnecessary to seal the valve at the top for all of the ports in the valve casing are at the bottom, and the valve is adequately sealed at the valve port area. The valve core 106 is a particularly close fit with the valve at the port opening 108a and the valve is also sealed on the outside by a freely movable shoe 130.

In a preferred form of construction, a single shoe 130 serves to seal both intake and exhaust ports by extending laterally along the axis of the valve. This shoe extends substantially half way around the outside of the valve.

The port opening 130a in the valve shoe is substantially larger than the port opening in the valve core to permit a free flow of gases in and out of the compression chamber. Inasmuch, however, as the valve shoe is free to move toward the valve and is held against the valve for sealing by means of a corrugated spring 132 it is found desirable to use a sealing ring 133 to cooperate with it. As shown in Figure 18, the sealing ring is provided with a substantial upstanding shoulder which acts as a heat deflector and protector for the narrow thin resilient wall upstanding and in contact with a cooperating projection 130c, on the shoe. The ring 133 is preferably shrunk into the valve casing 102 and is therefore prevented from movement with it. The thin resilient wall section will permit adequate movement of the shoe while still maintaining pressure tight sealing.

While Figures 18 and 19 are intended to illustrate a valve sleeve having its axis transverse to the longitudinal axis of the crank shaft it will be understood that the same or similar valve construction could be used with the axis parallel to the longitudinal axis of the engine or crank shaft.

It will thus be seen that the rotary sleeve valve of the transverse tubular or cuff type is equally suitable for either the control of a single cylinder or of a plurality of adjacent cylinders, in both forms having certain advantages. Probably for passenger type automobile engines where the length factor is important and operating parts must be reduced to a minimum the rotary valve will control two or more cylinders. On the other hand where space is less important and pressures are such that larger valves are necessary such as in air compressors and Diesel engine work it may be found that a single valve per cylinder is preferable. Different types of valve cores can be used, it being possible to either conduct the gases in and out at one side as in Figure 6 or if desired intake and outlet may be on opposite sides of the engine.

The valve mechanism has relatively few parts all of which may be contained in a single head, attachable to a standard form of cylinder block.

While we have described a preferred form of embodiment of the invention we are aware that other modifications may be made and we therefore desire a broad interpretation of our invention within the scope and spirit of the description herein and of the claims appended hereinafter.

We claim:

1. A rotary sleeve valve controlled internal combustion engine of the class described, having a plurality of cylinders and a reciprocating piston mounted within each cylinder, a compression chamber for each cylinder, a cylindrical core having passages therethrough for conducting motive fluid to and exhaust gases from said combustion chamber, a ported valve rotatably mounted on said core and adapted to control the passage of motive fluid to and of exhaust gases from said combustion chamber through said passages, means to rotate said valve, means to cool said valve, means to lubricate said valve, means to seal said valve comprising a ported sealing shoe, means normally urging the sealing shoe against the valve in sealing contact throughout the entire cycle of the engine, and a continuous sealing ring extending around the port in said sealing shoe and bearing outwardly in sealing contact with the wall of the same to position the shoe while permitting movement of the shoe toward and from the valve.

2. A unit of the class described having a plurality of cylinders and a reciprocating piston mounted within each cylinder, a compression chamber in each cylinder, valve means to control the compression in said chamber, said valve means comprising a short cylindrical tubular ported valve having a horizontal axis, a water cooled core within said valve, there being a clearance between the upper half of the peripheral surface of said core and said valve, means to rotate the valve, said core having a water inlet on one end, and a water outlet spaced therefrom to insure free circulation of cooling water and absence of steam pockets, said core having a plurality of gas conduits of uniform cross section, said conduits having ports on the same side of a diametrical plane through the core, and a sealing shoe bearing against said valve and supporting and forcing the same into gas tight sealing contact with the lower half of said core.

3. In a unit of the class described having a plurality of cylinders, a piston mounted within each cylinder, a compression chamber for each cylinder and valve means to control the compression in said cylinder, said valve means including a rotary sleeve, a water cooled core therefor, said core having a common passage for the exhaust gases of two cylinders and a separate passage for each cylinder for uniform intake, the ports of said passages being all on one side of a diametrical plane through said core, said core and valve being provided with a clearance therebetween at the opposite side from said ports whereby said valve may rotate and expand and contract freely, and means to lubricate said valve.

4. A rotary valve controlled unit of the class described having a plurality of cylinders, a reciprocating piston mounted within each cylinder, a compression chamber in each cylinder, a valve housing and valve means to control the intake to and exhaust from said compression chamber, means to cool said valve means, means to lubricate said valve means, said valve means including a rotary ported valve, said sealing means including a sealing shoe contacting with the valve at the port only, and a sealing ring between the shoe and the valve housing to seal the shoe with respect to the valve housing during movements of the sealing shoe against the valve, said sealing ring being fixedly secured in one of said members and resiliently contacting with the other member, said ring having an area subject to compression pressure to increase the pressure seal in accordance with increases of pressure, and spring means to normally force the shoe against the valve at all times.

5. A rotary valve controlled unit of the class described, having a plurality of cylinders, a reciprocating piston mounted within each cylinder, a compression chamber in each cylinder, a valve housing and valve means to control the intake to and exhaust from said compression chamber, means to cool said valve means, means to lubricate said valve means, said valve means including a ported valve, said sealing means including a sealing shoe contacting with the valve at the port, and a sealing ring between the shoe and the valve housing to seal the shoe with respect to the valve housing during movements of the sealing shoe against the valve, said sealing ring having a flexible portion with a reduced area of contact which resiliently fits the shoe so that the seal is maintained with the shoe during movements of the shoe, and which maintains a substantially low friction coefficient regardless of changes in compression pressure.

6. A unit of the class described having a plurality of cylinders and a reciprocating piston mounted within each cylinder, a compression chamber in each cylinder, valve means to control the compression in said chamber, said valve means comprising a rotary ported valve, a water cooled core mounted within said valve and means to rotate the valve, a valve casing for said valve, said casing having conduits extending to said valve from adjacent cylinders whereby said valve will control the compression in two cylinders, and a sealing shoe mounted in said valve casing, means to force said sealing shoe against said valve and means to seal said sealing shoe with respect to said valve casing, said sealing means including a separable ring having a heat deflector portion and a relatively thin resilient sealing portion, said sealing portion contacting with the sealing shoe over a relatively small area.

7. A rotary valve controlled unit of the class described having a plurality of cylinders, a reciprocating piston mounted within each cylinder, a compression chamber in each cylinder, a valve housing and valve means to control the intake to and exhaust from said compression chambers, means to cool said valve means, means to lubricate said valve means, said valve means including a ported valve, sealing means including a sealing shoe contacting with the valve at the port only and a sealing ring between the shoe and valve casing to maintain a pressure tight seal during movements of the sealing shoe, said sealing ring having a relatively thick portion and a relatively thin and flexible portion, said thick portion protecting said thin portion from injury due to the passage of high temperature gas, said thin portion contacting and forming a pressure tight seal with the shoe, and spring means to hold the shoe against the valve, said spring means being sufficiently powerful to overcome the friction between the shoe and the sealing ring and to prevent separation between the shoe and valve when cylinder vacuum tends to cause the shoe to move toward the sealing ring.

8. A rotary valve controlled unit of the class described having a pair of cylinders, a reciprocating piston in each cylinder, valve means to control the intake and exhaust of both of said cylinders including a ported valve and a relatively fixed valve member, and means to seal said valve at the ports including a relatively moveable sealing shoe cooperating with the valve, and a sealing ring maintaining a pressure seal between the relatively moveable shoe and the relatively fixed valve member, said sealing ring being integrally formed on the valve member and having a resilient portion in flexible contact with the sealing shoe and means to protect the resilient portion from high temperature gas.

9. A rotary valve controlled unit of the class described having a plurality of cylinders, a reciprocating piston in each cylinder, a valve means to control the intake and exhaust of each of said cylinders including a ported valve and a relatively fixed valve member, and means to seal said valve at the ports including a relatively moveable sealing shoe cooperating with the valve, and a sealing ring maintaining a pressure seal between the relatively moveable shoe and the relatively fixed valve member, said sealing ring being integrally formed on the sealing shoe and resiliently contacting with the valve casing.

10. A rotary valve controlled unit of the class described having a plurality of cylinders, a reciprocating piston in each cylinder, valve means to control the intake and exhaust of each of said cylinders including a ported valve and a relatively fixed valve member, and means to seal said valve at the ports including a relatively moveable sealing shoe cooperating with the valve, and a sealing ring maintaining a pressure seal between the relatively moveable shoe and the relatively fixed valve member, said sealing ring having parallel walls, and the contacting member having an offset portion of minimum contact area in resilient contact with one of the parallel walls.

11. A rotary valve controlled unit of the class described having a plurality of cylinders, a reciprocating piston in each cylinder, valve means to control the intake and exhaust of each of said cylinders including a ported valve and a relatively fixed valve member, and means to seal said valve at the ports including a relatively moveable sealing shoe cooperating with the valve and a sealing ring maintaining a pressure seal between the relatively moveable shoe and the relatively fixed valve member, said sealing ring having offset wall portions with a minimum area of contact, and in contact with portions of said sealing shoe.

12. A rotary valve controlled unit of the class described having a plurality of cylinders, a reciprocating piston in each cylinder, valve means to control the intake and exhaust of each of said cylinders including a ported valve and a relatively fixed valve member, and means to seal said valve at the ports including a relatively moveable sealing shoe cooperating with the valve and a sealing ring maintaining a pressure seal between the relatively moveable shoe and the relatively fixed valve member, said sealing ring having parallel walls and the relatively moveable member having an undercut area contacting with the parallel wall.

13. A sealing ring for sealing a ported conduit consisting of a fixed member and a moveable member subject to high temperatures which consists of an annular structure having a plurality of projecting portions, one of said portions being relatively thick and on the side nearest the high temperatures to act as a heat deflector, and the other of said projecting portions being relatively thin and resilient, said relatively thin and resilient member being in a sliding press fit with the relatively moveable member, the ring being in press fit relation with the fixed member.

14. A rotary sleeve valve controlled unit of the class described having a plurality of cylinders and a reciprocating piston mounted within each cylinder, a compression chamber in each cylinder, a valve means to control the intake to and exhaust from said compression chamber, a water cooled core for said valve means, means to lubricate said valve means, and means to seal said valve means, said valve means including a tubular valve transverse of the cylinder and engine axis, said valve having an aperture and said valve core having an aperture connected to a pressure oil supply, said valve aperture periodically registering with the valve core aperture whereby oil will be forced to the outside of the valve, and scraper means bearing against the outside of the valve for distributing oil over the valve and for removing the excess oil so as to maintain a thin film of oil on the outside of the valve.

15. In a unit of the class described having a plurality of cylinders, a compression chamber in each cylinder, a valve casing, a rotary ported tubular valve mounted within said casing and having a horizontal axis extending transversely of the center line of said cylinder, a core within said valve upon which said valve is journalled, said core and casing having communicating passages for conducting motive fluid to and exhaust gases from said cylinders respectively, the ports in said valve being adapted upon rotation of the valve to selectively establish communication between said passages, and a sealing shoe carried by said casing and bearing against said valve throughout the entire cycle of operation of said motor to seal said valve against the escape of gases around the ports therein.

16. In a unit of the class described having a cylinder, a piston mounted therein, a valve casing, a valve core having a pair of passages in communication with said cylinder, one of said passages being an intake passage adapted to conduct motive fluid to said cylinder, the other of said passages being an exhaust passage adapted to conduct exhaust gases from said cylinder, a rotary valve in said casing journalled directly on said core and having an intake port and exhaust port adapted upon rotation of the valve to be successively brought into register with said passages to permit motive fluid to enter the cylinder and to permit exhaust gases to leave the same, a sealing shoe mounted in said valve casing and bearing against said valve in sealing contact therewith, and arranged to press the valve against the core to cause sealing about the port, and means to seal said sealing shoe with respect to said valve casing.

17. In a unit of the class described having a cylinder, a piston mounted therein, a valve casing, a valve core having a pair of passages in communication with said cylinder, one of said passages being an intake passage adapted to conduct motive fluid to said cylinder, the other of said passages being an exhaust passage adapted to conduct exhaust gases from such cylinder, a rotary valve in said casing journalled on said core and having a true intake port and a true exhaust port adapted upon rotation of the valve to be successively brought into register with said passages to permit motive fluid to enter the cylinder and to permit exhaust gases to leave the same, said valve having a blind port in communication with said true intake port and occupying a position in the cylinder remote from said true intake port when the latter port is in register with said intake passage whereby motive fluid will be introduced into the cylinder with increased volumetric efficiency.

18. In a unit of the class described having a cylinder, a piston mounted therein, a valve casing, a valve core having a pair of passages in communication with said cylinder, one of said passages being an intake passage adapted to conduct motive fluid to said cylinder, the other of said passages being an exhaust passage, adapted to conduct exhaust gases from such cylinder, a rotary valve in said casing journalled on said core and having a true intake port and a true exhaust port adapted upon rotation of the valve to be successively brought into register with said passages to permit motive fluid to enter the cylinder and to permit exhaust gases to leave the same, said valve having a blind port in communication with said true exhaust port and occupying a position in the cylinder remote from said true exhaust port when the latter is in communication with said exhaust passage whereby exhaust gases will be expelled from said cylinder with increased volumetric efficiency.

19. In a unit of the class described having a cylinder a piston mounted therein, a valve casing, a valve core having a pair of passages in communication with said cylinder, one of said passages being an intake passage adapted to conduct motive fluid to said cylinder, the other of said passages being an exhaust passage, adapted to conduct exhaust gases from such cylinder, and a rotary valve in said casing journalled on said core and having a true intake port and a true exhaust port adapted upon rotation of the valve to be successively brought into register with said passages to permit motive fluid to enter the cylinder and to permit exhaust gases to leave the same, said valve having blind ports in communication with said true ports and occupying positions in the cylinder remote from said true ports when said true ports are in register with their respective passages.

20. The combination with a sealing shoe having a central port bounded by a peripheral wall and adapted for use in sealing the ports of a rotary valve, of a packing ring having a relatively thin resilient marginal sealing flange adapted to bear against said peripheral wall of the sealing shoe, and a heat deflector portion spaced inwardly from said sealing portion, said sealing portion contacting with said wall over a relatively small area.

21. The combination with a sealing shoe having a central port, and a projecting annular rib surrounding said port, of a packing ring having a relatively thin resilient sealing flange contacting with said rib, and a relatively thick deflector portion formed on said ring inwardly of said sealing flange.

22. The combination with a sealing shoe having a central port and a projecting annular rib surrounding said port, of a packing ring having a relatively thin resilient sealing flange contacting with said rib around the outer wall thereof.

23. In a rotary valve controlled unit of the class described having a plurality of cylinders, a ported tubular valve having a horizontal axis extending transverse to the axis of alignment of said cylinders and adapted upon rotation thereof to control the admission of motive fluid to and the exhaust of gases from said cylinders, a water cooled core mounted within said valve, a valve casing surrounding said valve, there being a clearance between the upper periphery of said valve and said casing and between the upper periphery of said core and said valve, a non-flexible sealing shoe mounted in said casing, means to force said shoe against said valve to force said valve against the core on which it is mounted, and means to seal said shoe with respect to said valve casing, the outer edges of said sealing shoe providing a clearance with said valve to permit free expansion and contraction of said valve.

24. In a rotary valve controlled unit of the class described having a plurality of cylinders, a ported tubular valve for controlling the admission of motive fluid to and the exhaust of gases from said cylinders, a water cooled core mounted within said valve, a valve casing surrounding said valve, there being a clearance between the upper periphery of said valve and said casing and between the upper periphery of said core and said valve, a non-flexible sealing shoe mounted in said casing, means to force said shoe against said valve to force said valve against said core, and means to seal said shoe with respect to said casing.

25. In a rotary valve controlled unit of the class described having a plurality of cylinders, a ported tubular valve for controlling the admission of motive fluid to and the exhaust of gases from said cylinders, means to lubricate said valve, a core mounted within said valve, a sealing shoe bearing against said valve and forcing said valve into sealing contact with said core, the outer edges of said shoe being slightly spaced from said valve to provide a clearance and a scraping element mounted on a stationary part of the engine and bearing against said valve during the rotation thereof in advance of said shoe to remove surplus lubricant therefrom.

26. In a unit of the class described having a plurality of cylinders, a compression chamber in each cylinder, a valve casing, a rotary ported tubular valve, a core within said valve upon which said valve is journaled, said core and casing having communicating passages for conducting motive fluid to and exhaust gases from said cylinders, the ports in said valve being adapted upon rotation of the valve to selectively establish communication between said passages, and a sealing shoe carried by said casing and bearing against said valve throughout the entire cycle of operation of said motor to seal said valve against the escape of gases around the ports therein, means for providing a seal between the shoe and casing comprising a resilient annular sealing element and a cylindrical surface against which it bears and relative to which it moves upon movement of the shoe, said shoe being free to move radially of the valve, angularly and rotatively to permit the same to automatically adjust its position with reference to the valve.

27. A unit of the class described having a plurality of cylinders and a reciprocating piston mounted in each cylinder, a compression chamber in each cylinder, valve means to control the compression in said cylinders, said valve means comprising a short cylindrical tubular ported valve having a horizontal axis extending transverse to the cylinders, a water cooled core within said valve and means to rotate the valve, said core having a water inlet and a water outlet spaced from each other to insure free circulation and absence of steam pockets, said core having an exhaust conduit and an intake conduit communicating with both compression chambers and extending out at opposite ends of the core and an intake manifold secured to one end of the core and an exhaust manifold secured to the other end of the core.

28. In an engine the combination with a rotary valve and a sealing shoe having a central port and a projecting annular rib surrounding said port, of a packing ring secured in the engine casing and having a relatively thin resilient sealing flange engaging said annular rib to position the same and to form a gas tight seal therewith while permitting relative movement.

29. In a unit of the class described, the combination with a combustion chamber having an exhaust port of a rotary valve controlling said exhaust port and sealing means comprising a sealing shoe bearing against the valve, a member carried by the combustion chamber, surrounding the exhaust port and having a resilient cylindrical flange slidably engaging a cylindrical surface of the shoe to position the shoe and to form a gas tight seal, together with means for pressing the shoe against the valve.

30. The combination with an internal combustion engine having a plurality of successively operative cylinders, a piston in each cylinder and a crankshaft operatively connected to said pistons, of a hollow core, said core and said cylinders having alined ports for admission of fuel to and exhaust of gases from said cylinders, a ported tubular valve mounted on said core and controlling said alined ports and springs for pressing said valve firmly against said core to form a gas tight seal during the exhaust of gases from said cylinder.

JOSEPH A. ANGLADA.
AXEL H. ASPROOTH.
CONRAD L. CHRISTENSEN.